(12) United States Patent
Pubanz et al.

(10) Patent No.: US 11,174,136 B2
(45) Date of Patent: Nov. 16, 2021

(54) HOISTING SYSTEM FOR INSTALLING A WIND TURBINE

(71) Applicant: LAGERWEY WIND B.V., Barneveld (NL)

(72) Inventors: André Heinz Pubanz, Amersfoort (NL); Hendrik Lambertus Lagerweij, Kootwijkerbroek (NL); Aart Van De Pol, Otterlo (NL); Albertus Waaijenberg, Barneveld (NL)

(73) Assignee: LAGERWEY WIND B.V., Barneveld (NL)

( * ) Notice: Subject to any disclaimer, the term of this patent is extended or adjusted under 35 U.S.C. 154(b) by 0 days.

(21) Appl. No.: 16/497,752

(22) PCT Filed: Apr. 3, 2018

(86) PCT No.: PCT/EP2018/058505
§ 371 (c)(1),
(2) Date: Sep. 25, 2019

(87) PCT Pub. No.: WO2018/185111
PCT Pub. Date: Oct. 11, 2018

(65) Prior Publication Data
US 2020/0024110 A1    Jan. 23, 2020

(30) Foreign Application Priority Data
Apr. 3, 2017 (NL) ...................... 1042325

(51) Int. Cl.
*B66C 23/20* (2006.01)
*F03D 13/10* (2016.01)
(Continued)

(52) U.S. Cl.
CPC .......... *B66C 23/207* (2013.01); *B66C 23/185* (2013.01); *E04H 12/34* (2013.01);
(Continued)

(58) Field of Classification Search
CPC ..... B66C 23/207; B66C 23/20; B66C 23/185; F03D 13/10; F03D 80/50; E04H 12/34;
(Continued)

(56) References Cited

U.S. PATENT DOCUMENTS 8,069,634 B2    12/2011    Livingston et al.
8,113,362 B2 *    2/2012    Stommel ............... B66C 23/185
                                                      212/167
(Continued)

FOREIGN PATENT DOCUMENTS

EP            1677007 A2      7/2006
JP            2003063780 A    3/2003
(Continued)

*Primary Examiner* — Andrew J Triggs
(74) *Attorney, Agent, or Firm* — Seed Intellectual Property Law Group LLP

(57) ABSTRACT

A hoisting system for the at least one of an installation, a decommissioning and a maintenance of a wind turbine which comprises at least a foundation, a tower, a yawing part and a rotor of at least 80 m diameter with at least one blade, comprising a first hoisting device which comprises measures to establish a load carrying joint with an already built part of the wind turbine which is located above the foundation, wherein the hoisting system is characterized in that the ratio between the maximum hoist load of the hoisting device and the mass of the heaviest part is larger than 0.2 and smaller than 1 and in particular smaller than 0.8 and more in particular smaller than 0.7 and preferably smaller than 0.6, with the heaviest part being a heaviest part which is hoisted as one piece and which belongs to the yawing part of wind turbine.

18 Claims, 5 Drawing Sheets

(51) Int. Cl.
*F03D 80/50* (2016.01)
*B66C 23/18* (2006.01)
*E04H 12/34* (2006.01)

(52) U.S. Cl.
CPC .............. *F03D 13/10* (2016.05); *F03D 80/50* (2016.05); *F05B 2230/61* (2013.01); *F05B 2240/916* (2013.01)

(58) Field of Classification Search
CPC ............... E04H 12/345; F05B 2230/61; F05B 2240/916
See application file for complete search history.

(56) References Cited

U.S. PATENT DOCUMENTS

| | | | | |
|---|---|---|---|---|
| 8,640,340 | B2* | 2/2014 | Foo | B63B 35/003 |
| | | | | 114/259 |
| 9,376,291 | B2* | 6/2016 | Laurens | B66C 23/207 |
| 9,394,880 | B2* | 7/2016 | Zuteck | E04H 12/342 |
| 9,528,492 | B2* | 12/2016 | Davis | B66C 23/185 |
| 2010/0065524 | A1* | 3/2010 | Stommel | B66C 23/185 |
| | | | | 212/270 |
| 2010/0139062 | A1 | 6/2010 | Reed et al. | |
| 2010/0293781 | A1* | 11/2010 | Foo | B66C 23/52 |
| | | | | 29/791 |
| 2011/0017695 | A1* | 1/2011 | Vandenbulcke | B66C 23/74 |
| | | | | 212/279 |
| 2012/0027561 | A1* | 2/2012 | Riddell | B66C 1/18 |
| | | | | 414/800 |
| 2013/0081337 | A1 | 4/2013 | Zavitz et al. | |
| 2015/0048043 | A1* | 2/2015 | Laurens | F03D 13/10 |
| | | | | 212/179 |
| 2016/0010623 | A1 | 1/2016 | Zuteck | |
| 2016/0273515 | A1 | 9/2016 | Bueno De Santiago | |
| 2020/0024110 | A1* | 1/2020 | Pubanz | B66C 23/207 |

FOREIGN PATENT DOCUMENTS

| | | |
|---|---|---|
| JP | 2005082352 A | 3/2005 |
| JP | 2009113922 A | 5/2009 |
| RU | 2570307 C2 | 12/2015 |
| WO | 02/34664 A1 | 5/2002 |
| WO | 2011/082710 A1 | 7/2011 |

* cited by examiner

HOISTING SYSTEM FOR INSTALLING A WIND TURBINE

BACKGROUND

Technical Field

The present invention relates to a hoisting system for the installation of a wind turbine.

Description of the Related Art

The costs of labor and maintenance of wind turbines increase only gradually with increasing turbine size, and therefore to minimize costs, wind turbines are getting bigger and bigger. With increasing size and height, the installation costs of the turbines are not rising gradually but at least linearly with turbine size. The largest industrial cranes available are required to install the largest land-based wind turbines. Those heavy modular crane units are expensive, often require strengthening of the roads and special transportation permits. In addition to these disadvantages said cranes need a lot of space, which is not always available; and when such a crane is needed for the next turbine in a wind farm, it may occur that the crane cannot move thereto for example because the terrain is complex or the roads are too small. Then the crane has to be decommissioned, transported in parts and commissioned again, which is an inefficient time-consuming operation.

As previously explained, the installation costs rise quickly with the size of the required crane. The size of the crane is determined by the maximum weight of the hoist and by the reach of the crane. The reach of the crane is determined essentially by the height of the turbine. So in particular the heavy parts at the top of the wind turbine are responsible for the high installation costs. Dozens of trucks are required just to transport such a crane in case of an onshore turbine. For an offshore turbine, cranes are required which are installed on so-called jack-ups: self-elevating platforms with moveable legs capable of raising the hull over the surface of the sea. This is also a very expensive method.

A relatively new solution is to use a crane which climbs along the tower of a wind turbine under construction. Such a crane leads to a major reduction of the installation costs. However for the installation of the heaviest parts of the top of the wind turbine the loads exerted by the climbing crane to the wind turbine are very high. This increases the costs of the climbing crane and requires strengthening of the wind turbine which further increases costs. Another method is that disclosed in U.S. Pat. No. 8,069,634, wherein a lifting frame is installed on top of the wind turbine tower with a conventional crane so that subsequently the lifting frame can hoist the heavy parts to the tower top. The lifting frame of this solution is a large and heavy structure and although there is some improvement compared to the use of a large industrial crane, the costs are still high and much time is required to commission the lifting frame at the site.

Therefore there is a need to be able to install both offshore and onshore wind turbine more efficiently and in particular without the need of a large general purpose crane.

BRIEF SUMMARY

The present invention relates to a hoisting system for the installation of a wind turbine, a wind turbine comprising measures to facilitate the use of said hoisting system, the efficient installation of heavy parts of the wind turbine, the installation of a direct drive generator or a rotor of a wind turbine, the decommissioning and the maintenance of a wind turbine, a method for installing a hoisting system to a wind turbine and a method for efficient hoisting of heavy parts of a wind turbine using the hoisting system Hereto, according to an aspect of the invention a hoisting system is proposed for the installation and or the decommissioning and or the maintenance of a wind turbine, the wind turbine comprising at least a foundation, a tower, a yawing part and a rotor of at least 80 meters (m) diameter with at least one blade, the hoisting system comprising a first hoisting device which comprises measures to establish a load carrying joint with an already built part of the wind turbine which is located above the foundation, wherein the hoisting system is characterized in a ratio between the maximum hoist load of the first hoisting device and the mass of the heaviest part which is larger than 0.2 and smaller than 1 and in particular smaller than 0.8 and more in particular smaller than 0.7 and preferably smaller than 0.6, with the heaviest part being a part which is hoisted as one piece and which belongs to the yawing part of wind turbine.

At first sight the expert in the art would never design such a hoisting system since it seems incapable of hoisting the maximum hoist. Surprisingly one should realize that by using the combination of the first hoisting device and the crane which was used to install the first hoisting device, there is sufficient capacity. The amazing result is that the first hoisting device can be lighter, thus less expensive and that the loads it will exert on the turbine are less, so that the joints can be cheaper and that the hoisting system is capable of hoisting the heaviest part. Advantageously the hoisting system distributes the hoist load over at least the first and another hoisting device. This way both systems can be dimensioned for a lower maximum load and thus will be cheaper and lighter.

Another benefit of an embodiment of the invention is that wherein the hoist is hoisted by two hoisting cables, each fixed at one end to the hoist and at the other end to a different hoisting device, so that it can be controlled better and becomes less sensitive to the wind. The hoist can be positioned more accurately which speeds up the installation process and reduces the risk of a damaging collision between the hoist and the already installed part of the wind turbine.

In an embodiment the first hoisting device of the hoisting system is supported on the yawing part of the wind turbine. The yawing part is defined as the part of the wind turbine which can yaw with respect to the tower top. Another possible definition is that the yawing part is the part of the wind turbine which is connected to the turnable part of the yaw bearing of the wind turbine if such a bearing is present. Parts of the wind turbines which usually belong to the yawing part are the main frame, the nacelle, the generator which can be a direct drive generator, the gear box if present, the hub, the blades, possibly the transformer. Also the yaw bearing itself is considered to be part of the yawing part.

In an embodiment the first hoisting device is connected to the tower top and thus not to the yawing part.

In a preferred embodiment the maximum hoist capacity of the first hoisting device is less than 100 tons and in particular of less than 90 tons and more in particular of less than 80 tons. In a further preferred embodiment, the weight of the heaviest part which is hoisted in one piece and which belongs to the yawing part of the wind turbine is more than 100 tons and in particular more than 110 tons.

In an embodiment of the hoisting system the first hoisting device comprises a winch which is fixed to the first hoisting device, so that the loads exerted by the winch are passed via the first hoisting device and via its connections point to the already installed part of the wind turbine.

In an embodiment the first hoisting device of the hoisting system comprises a beam with the lifting point and at least one connection point for creating a load bearing connect between the hoisting device and the already built part of the wind turbine, wherein the lifting point can move relative to the at least one connection point and in particular that this movement allows for a horizontal displacement by more than 1 m and more in particular more than 3 m and preferably more than 5 m and less than 30 m. The horizontal displacement may be accompanied with a vertical displacement at the same time.

In an embodiment the wind turbine is a direct drive wind turbine and the heaviest part is a direct drive generator or is a substantial part of the direct drive generator.

According to an embodiment of the invention the hoisting system further comprises a second hoisting device which can be a multi-purpose industrial crane. The advantage is that the industrial crane can have a smaller capacity since it does not need to hoist the full weight of the heaviest parts but can share the load with the first hoisting device. The second hoisting device can also be a crane which is supported by the bottom of the water wherein the wind turbine is installed, or a crane on a vessel, which vessel may be stabilized by a structure to the bottom of the water.

According to an embodiment of the invention the second hoisting device is a crane which is installed to the tower of the wind turbine, possibly with the ability to climb along the tower. Such a second hoisting device can be smaller and cheaper if it does not need to hoist the heaviest part alone. Also the loads transferred to the tower by such a second hoisting device are less and thus less tower strengthening is required, which further reduces the costs. According to this embodiment of the invention the heaviest parts are hoisted by the first hoisting device and by the second hoisting device.

According to an embodiment of the invention the second hoisting device comprises measures to make a load bearing connection to the tower of the wind turbine, wherein the wind turbine tower comprises matching points for receiving the second hoisting device. The second hoisting device further may comprise measures for climbing along the tower, in particular essentially in vertical direction.

A definition of the heaviest part is the heaviest part of the wind turbine which belongs to the yawing part of the wind turbine and is hoisted in a single hoist. Examples of heaviest parts are the direct drive generator, the rotor of the wind turbine, or substantial parts of the direct drive generator or the rotor.

According to an embodiment of the invention the hoisting system further comprises a third hoisting device. For example the first hoisting device is fixed to the yawing part of the wind turbine, the second hoisting device is fixed to the tower of the wind turbine and the third hoisting device is a relatively small multi-purpose industrial crane, which may be used to install the second hoisting device to the tower or possibly for picking the first hoisting device from a truck to a position from where the second hoisting device may take it over. The third hoisting device may be used further for picking the heaviest load from a transportation means, such as, e.g., a truck, and moving it to a position where the first and the second hoisting devices take over the load. More in general the third hoisting device may at least during a part of the hoisting operation carry a part of the mass of the heaviest part.

In an embodiment the hoisting system further comprises a balancing device which distributes the mass of the heaviest part in a mass part carried by the first hoisting device and a part carried by the second hoisting device, wherein the mass part carried by the first device is between 1% and 99%, in particular between 20% and 80%, more in particular between 40% and 60% and preferably wherein the first hoisting device and the second hoisting device each carry approximately 50%. The balancing device may be a pulley with its shaft connected to the hoist and wherein the cable over the pulley is connected at one side to the first hoisting device and with the other side to the second hoisting device. The balancing device may alternatively be a structural beam which is supported by the first hoisting device at one end and by the second hoisting device at the other end. The hoist load can be connected to a lifting point in the middle of the structural beam so that the hoist is evenly distributed over the hoisting devices when the structural beam is in an about horizontal position. The lifting point can also be closer to one end so that the hoisting system at that end will receive a higher share of the load.

In an embodiment the hoisting system further comprises a control system which uses data on the stand and loading of both the first and the second hoisting devices to control both devices and in particular which uses the measured loads of the first hoisting device to control the operation of the second device and more in particular also uses the loads of the second hoisting device to control the operation of the first hoisting device. Such a control system avoids that operation of the first hoisting device causes an overload of the second device and the other way around, According to an aspect of the invention a method is proposed for installing a wind turbine, the method comprising the hoisting of the first hoisting device by another hoisting device to a position where it is fixed to an already built part of a wind turbine, above the foundation. In particular the first hoisting device is installed to the yawing part of the wind turbine.

In an embodiment the method further comprises the hoisting of the heaviest part by at least the first hoisting device wherein, during the hoisting operation, the largest mass part of the heaviest part which is carried by the first hoisting device is less than 99%, in particular less than 80%, more in particular less than 60% and preferably about 50%.

In an embodiment the method further comprises that during a part of a hoisting operation of the heaviest part by only the first hoisting device and the second hoisting device, there is a hoisting position where the first hoisting device would be overloaded in the case that only the first hoisting device would carry the heaviest part and in particular that there is a hoisting position where the second hoisting device would be overloaded in the case that only this second device would carry the heaviest part.

In an embodiment of the hoisting system comprises a first hoisting device which comprises means for supporting it on the yawing part of the turbine under construction, a second hoisting in the form of a climbing crane and a third hoisting device in the form of a relatively small industrial crane. The industrial crane installs the climbing crane. The climbing crane installs the higher tower segments, the main frame and the nacelle and the first hoisting device. The first hoisting device together with the climbing crane subsequently install the direct drive generator, the hub and the blades. The advantage of this hoisting system using this hoisting method is that a large industrial crane is not required for an onshore wind turbine. In the case of an offshore turbine, the use of a largest lifting vessel or a jack-up is avoided, by using the climbing crane to install the first hoisting device and subsequently using the first hoisting device and the climbing crane for hoisting the yawing part of the wind turbine in part or in a single hoist.

BRIEF DESCRIPTION OF THE SEVERAL VIEWS OF THE DRAWINGS

The following drawings show exemplary embodiments of the invention.

The drawings are to be understood not to be drawn to scale.

DETAILED DESCRIPTION

Figure 1:
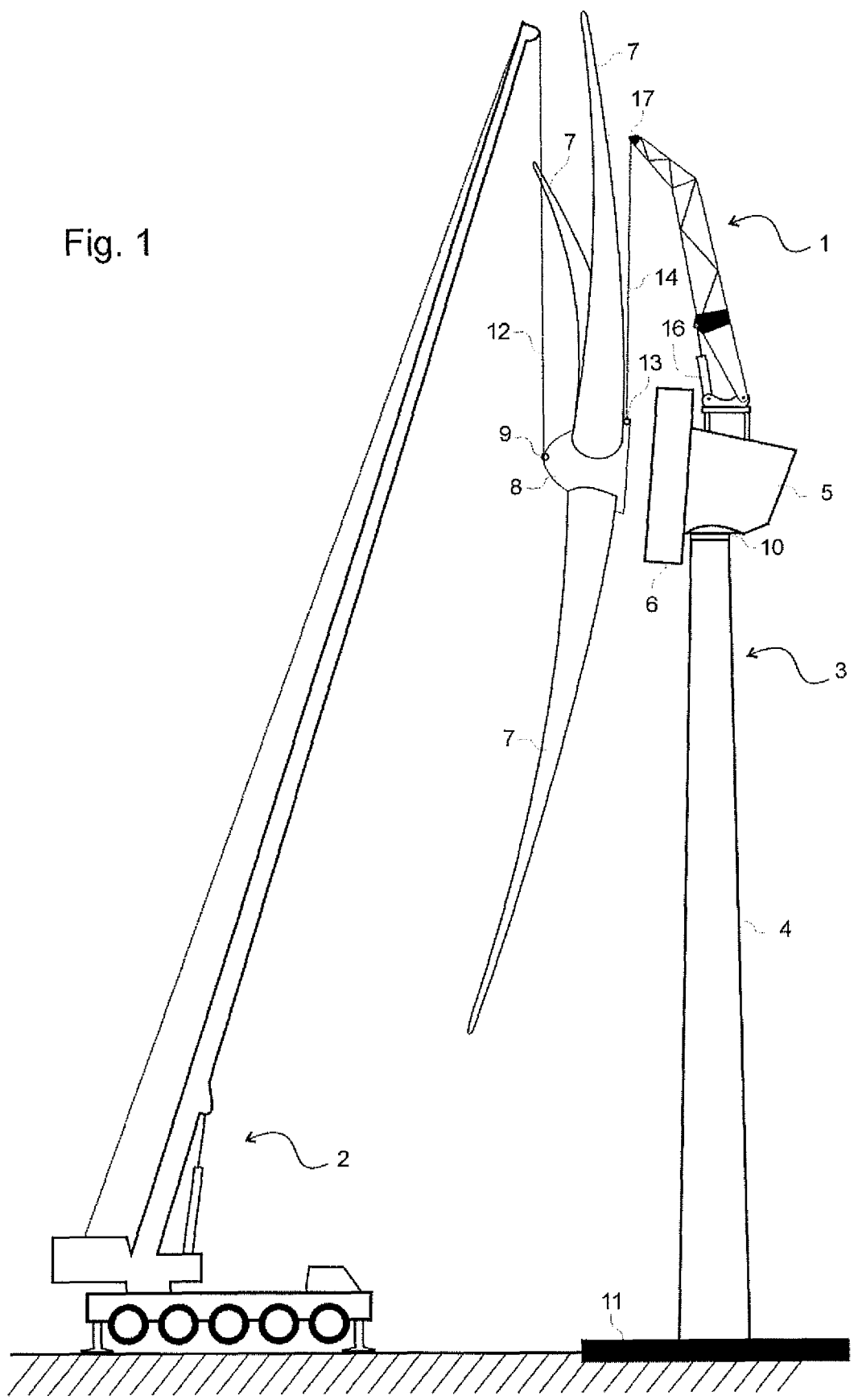
FIG. 1: a wind turbine under construction and a hoisting system.

FIG. 1 shows a hoisting system comprising a first hoisting device 1 and a second hoisting device 2 which is used for the installation of a wind turbine under construction 3. The wind turbine comprises a foundation 11, a tower 4 and a yaw bearing 10. The yawing part comprises a nacelle 5, a direct drive generator 6 and a rotor which comprises a hub 8 and one or more blades 7. The rotor may be the heaviest part. The first hoisting device is supported on the yawing part of the wind turbine and comprises a beam 15 and a hoisting cable 14 which is fixed to hoisting point 13 of the rotor. The second hoisting device comprises a hoisting cable 12 and is fixed to hoisting point 9 of the rotor. It further comprises actuator 16 which allows for an inter alia horizontal movement of the lifting point 17.

Figure 2:
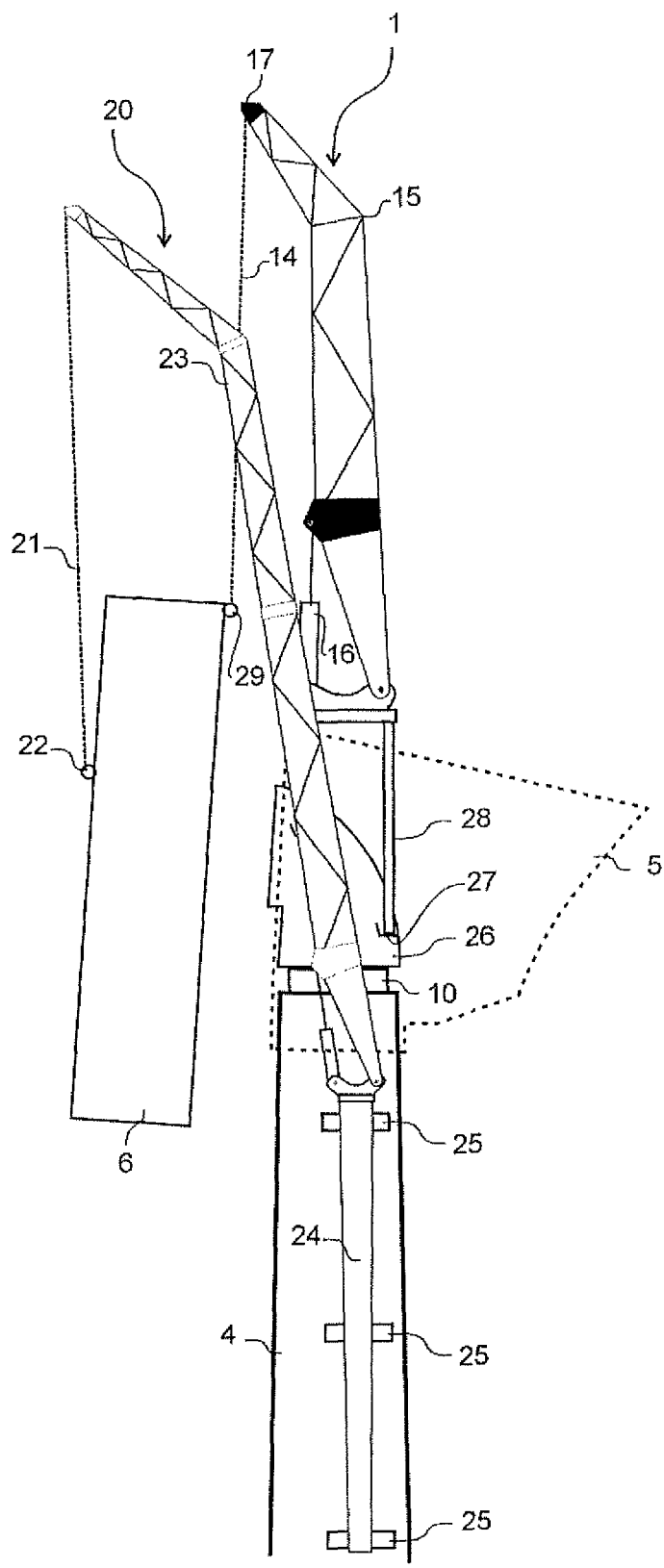
FIG. 2: a wind turbine under construction and a hoisting system.

FIG. 2 shows another hoisting system comprising a first hoisting device 1 and a second hoisting device 20, which is used for the installation of a wind turbine under construction. The nacelle 5 of the wind turbine under construction is drawn transparent in this figure, so that the main frame 26 is visible which is supported to yaw bearing 10. The main frame has a support 27 whereon a beam 28 of the first hoisting device 1 is mounted. The first hoisting device is hoisting a part of the mass of the generator 6 via hoisting cable 14 which is fixed to hoisting point 29. The second hoisting device is a climbing crane with a column 24 which is mounted to the wind turbine tower 4 by fixation points 25 which are installed to the tower. The climbing crane further comprises the beam 23 and hoisting cable 21 with is fixed to hoisting point 22 on the direct drive generator 6. The direct drive generator may be the heaviest part, which is hoisted by the combination of the first hoisting device and the second hoisting device.

FIG. 3 shows again another hoisting system comprising a first hoisting device in the form of climbing crane 35 and a second hoisting device in the form of a climbing crane 36. In the FIG. 3 only two of the many fixation points 25 are numbered. The heaviest part is the nacelle 33 which is hoisted by the hoisting system, i.e., by the two climbing cranes.

Figure 3:
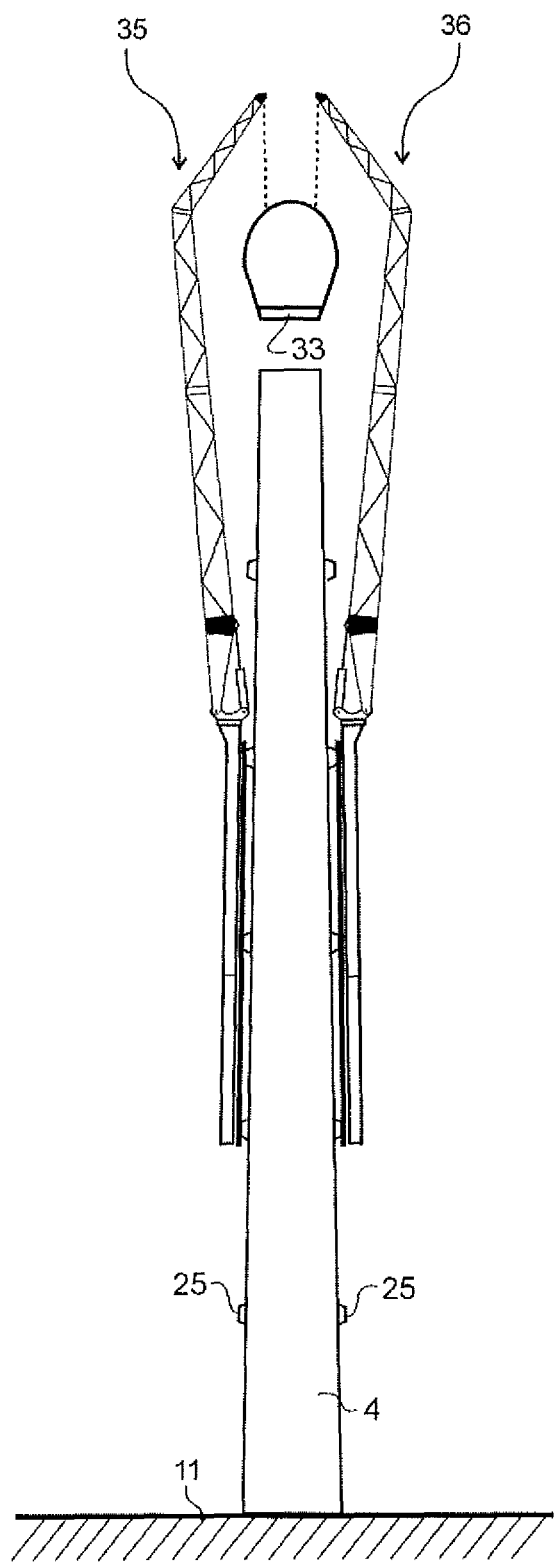
FIG. 3: a wind turbine under construction and a hoisting system.

In FIGS. 1 to 3 the first and or the second hoisting devices have insufficient capacity to hoist and install the heaviest part alone.

Figure 4:
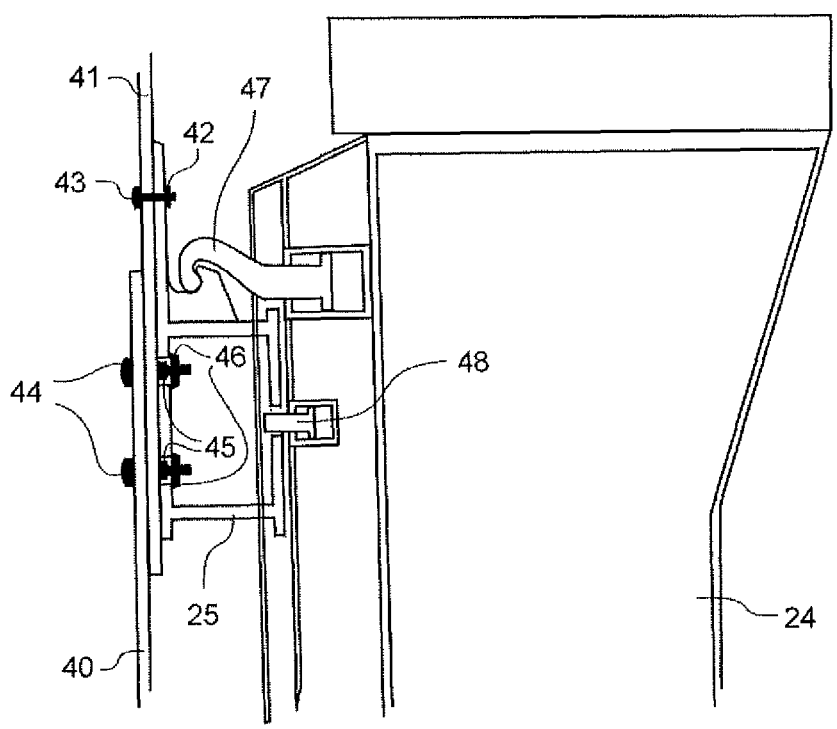
FIG. 4: a wind turbine tower with a climbing crane and a fixation point.

FIG. 4 shows a cross section of a part of the tower of a wind turbine with lower tower segment 40 and an upper tower segment 41, that of a fixation point 25 and that of a part of a climbing crane 24, of which crane also a locking pin 48 and a locking hook 47 are drawn. The fixation point is fixed to the tower segments in a detachable manner by bolts 43 and 44. By removing nuts 42 and 46, the fixation point 25 can be taken off and be reused on another wind turbine tower. The connection between the tower segments is remained by bolts 44 combined with nuts 45.

Figure 5:
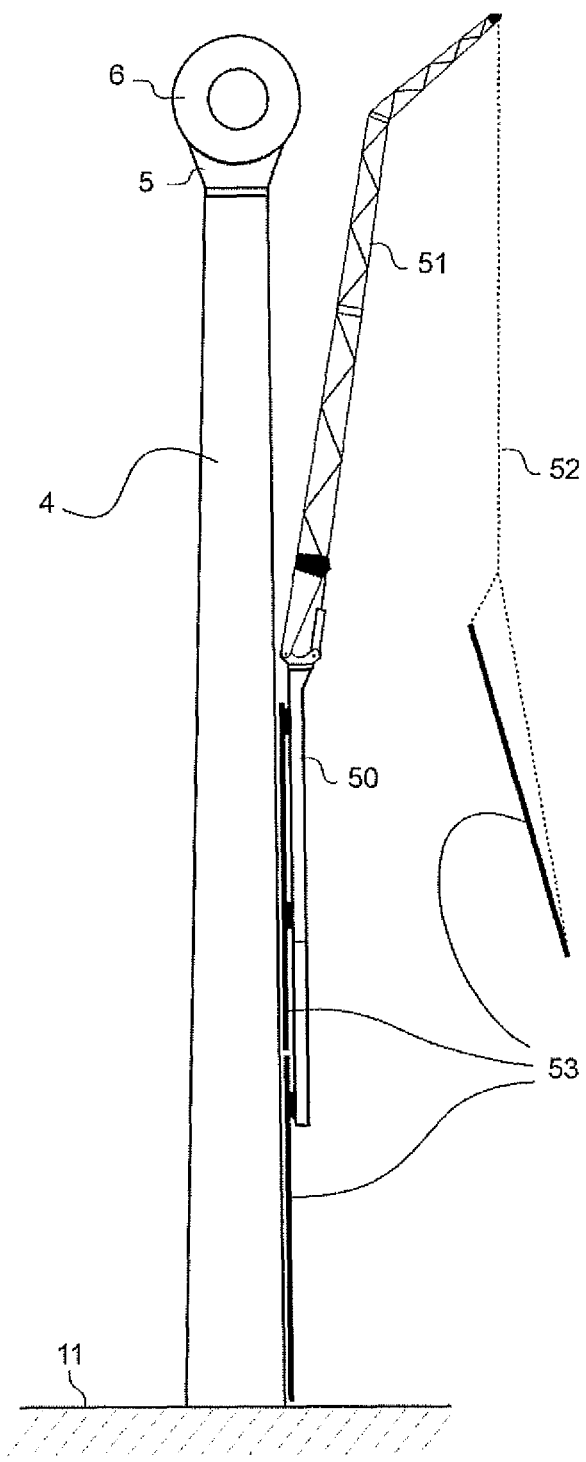
FIG. 5: a wind turbine under construction with a rail-type fixation point.

FIG. 5 shows a wind turbine under construction with a climbing crane 50 with a beam 51 and a hoisting cable 52. The climbing crane is attached to rail-type fixation points 53 and possibly can move in essentially vertical direction along the rail type fixation points. The rail type fixation points can be completely or partially removed from the tower. The climbing crane may install the higher fixation points and may take them off, completely or partially, so that they can be reused for another wind turbine. The rail type fixation points can be connected to each other and can be connected to the wind turbine tower by any known method such as, e.g., a bolted connection. The connection is not shown in FIG. 5.

The hoisting system or another hoisting system may comprise a climbing crane which is fixed to any of the fixation points on the tower and possibly can move along the tower. The fixation points which are required for the installation of a wind turbine contribute considerably to the costs. According to an embodiment of the invention, the fixation points are partly or fully removable so that they can be taken off after the installation of the wind turbine and can be reused for the installation or the maintenance or the decommissioning of another wind turbine. A method to install the fixation points comprises any of the steps of installing one or more lower fixation points by a small multipurpose crane, the installation of the climbing crane to the installed fixation points and the installation of higher fixation points with the climbing crane.

Alternatively, a small auxiliary crane, fixed to the wind turbine, for example to the yawing part of the wind turbine, is used to hoist the fixation points to the positions where they are installed. The same methods, in reversed order can be used to remove the fixation points. A possibility is that a part of the fixation points is removable and a part not, another possibility is that some fixation points are partly removable, for example essentially the part at the outside of the tower can be removable while essentially the inward part remains on the tower.

According to one aspect the fixation points are attached to the tower using bolts, the bolts are attached to extend in a horizontal way through a wall of the tower, in particular for connecting two overlapping tower segments made of metal to each other, and each fixation point is attached to the tower by completely or partly using at least one of the bolts and using additional nuts fixing the fixation point to the bolts and thereby fixing the fixation point to the tower. This way the fixation points can be installed in an effective way and at the same time provide a solution that allows the fixation points to be removed. According to one aspect the bolts remain in the tower wall when removing the fixations points and that may avoid the need to close the corresponding bores.

The term climbing crane in the above description may be interpreted as any crane which can be attached to an already installed part of the wind turbine above the foundation and is capable of installing at least the upper quarter of the tower. An embodiment of the climbing crane can climb along the tower essentially in vertical direction. In another embodiment of the climbing crane it can be fixed at a single position to the tower above the foundation and the climbing only refers to the single step of moving from ground level to this single position.

A fixation point can be any structure which is attached to the tower before a climbing crane is connected to it, with the purpose to distribute over a certain tower area, the forces exerted by the climbing crane to the tower, so that the tower will not be overloaded. According to an embodiment of the invention such a fixation point can be partly or completely taken off the tower and the detachable parts can be reinstalled on another tower. A tower can have several distinct fixation points with at least 5 meters and in particular at least 10 meters between the positions where the climbing crane connects. Alternatively, a fixation point can be of a linear type, e.g., it can be a rail over which the climbing crane can move up and down and is called a rail-type fixation point. According to an embodiment of the invention such a rail-type fixation point can also be partly or completely removed so that the removable parts can be reinstalled on another tower.

The term another tower can refer to another tower under construction. The tower of the turbine can be made of any material and in particular of metal, concrete, wood, composite or a combination thereof. One or more holes in the tower wall are an option to facilitate, e.g., the installation of a fixation point and such holes may be closed with a plug, e.g., of rubber in the case that a fixation point is partly of completely removed.

The above description focuses at the installation of wind turbines using a hoisting system. The invention is not limited to the installation of wind turbines and may additionally or alternatively be used for maintenance or decommissioning of wind turbines using the hoisting system.

The hoisting system may be controlled via a computer that only allows for operation within the operational limits of the system. The system may be controlled by remote and fixed controllers, e.g., from the ground, in the crane and in the turbine under construction. A crane operator may be assisted by cameras.

It is to be understood that in the present application, the term "comprising" does not exclude other elements or steps. Also, each of the terms "a" and "an" does not exclude a plurality. Any reference sign(s) in the claims shall not be construed as limiting the scope of the claims.

The invention claimed is:

1. A hoisting system for at least one of an installation, a decommissioning, or a maintenance of a wind turbine, the wind turbine comprising a foundation, a tower, a yawing part, a rotor with a diameter of at least 80 meters, and at least one blade, the hoisting system comprising:
   a first hoisting device having a first hoisting cable; and
   a second hoisting device having a second hoisting cable, the second hoisting cable being a different cable from the first hoisting cable, wherein the second hoisting device is not supported on the already built part of the wind turbine,
   wherein the first hoisting device is configured to create a load carrying joint with an already built part of the wind turbine, wherein the already built part of the wind turbine is located above the foundation, wherein the hoisting system has a ratio between a maximum hoist capacity of the first hoisting device and a mass of a heaviest part, wherein the ratio is greater than 0.2 and less than 1, wherein the heaviest part is a part that is hoisted as a single piece and belongs to the yawing part of the wind turbine.

2. The hoisting system according to claim 1, wherein the first hoisting device is supported on the yawing part of the wind turbine.

3. The hoisting system according to claim 1, wherein the first hoisting device has a maximum hoisting capacity of less than 100 tons and the heaviest part has a mass of more than 100 tons.

4. The hoisting system according to claim 1, wherein the wind turbine is a direct drive wind turbine and the heaviest part is a direct drive generator or a portion of a direct drive generator.

5. The hoisting system according to claim 1, wherein while hoisting the heaviest part, the hoisting system distributes the load over the first and the second hoisting devices.

6. The hoisting system according to claim 5, further comprising a balancing device configured to distribute the mass of the heaviest part so that a first portion is supported by the first hoisting device and a second portion is supported by the second hoisting device, wherein a mass of the first portion is between 1% and 99% of a total mass of the heaviest part.

7. The hoisting system according to claim 6, wherein the mass of the first portion is between 40% and 60% of a total mass of the heaviest part.

8. The hoisting system according to claim 1, wherein the second hoisting device is configured to create a load bearing connection to the tower of the wind turbine and is configured to move the second hoisting device along the tower.

9. The hoisting system according to claim 1, further comprising a third hoisting device, wherein while hoisting, the third hoisting device is configured to carry a part of the mass of the heaviest part.

10. The hoisting system according to claim 9, wherein the third hoisting device is a crane located next to and separated from the wind turbine.

11. The hoisting system according to claim 1, further comprising a plurality of fixation points on the tower and a climbing crane, wherein the climbing crane is fixed to at least one of the fixation points and is configured to move along the tower, wherein one or more of the plurality of fixation points are partly or fully removable so that they can be taken off after the installation, decommissioning, or maintenance of the wind turbine.

12. A method for a hoisting operation using the hoisting system according to claim 11, further comprising:
   installing one or more fixation points on the tower,
   fixing a climbing crane to one or more of the fixation points, and
   removing the one or more fixation points.

13. The method according to claim 12, wherein:
   the fixation points are attached to the tower using bolts,
   the bolts extend in a horizontal way through a wall of the tower for connecting two overlapping tower segments made of metal to each other, and
   at least one fixation point is attached to the tower by completely or partly using at least one of the bolts and using nuts fixing the fixation point to the bolts and thereby fixing the fixation point to the tower.

14. A method for a hoisting operation using the hoisting system according to claim 1, comprising:
   hoisting the first hoisting device using the second hoisting device, wherein the first hoisting device is hoisted and fixed to an already built part of a wind turbine, above the foundation.

15. The method according to claim 14, further comprising:

hoisting of the heaviest part by at least the first hoisting device and the second hoisting device, wherein during the hoisting, a largest mass part of the heaviest part being supported by the first hoisting device is less than 99% of a total mass, wherein the heaviest part is a heaviest part that is hoisted as a single piece and belongs to the yawing part of the wind turbine.

16. The method according to claim 15, wherein during a part of the hoisting operation of the heaviest part by at least a combination of the first hoisting device and the second hoisting device, there is a first hoisting position in which the first hoisting device would be overloaded if only the first hoisting device carried the heaviest part and there is a second hoisting position in which the second hoisting device would be overloaded if only the second hoisting device carried the heaviest part.

17. The hoisting system according to claim 1, wherein the ratio is less than 0.6.

18. The hoisting system according to claim 1, wherein the second hoisting device is located on the foundation.

* * * * *